United States Patent [19]

Wise

[11] 4,290,642
[45] Sep. 22, 1981

[54] CONVERTIBLE FLAT/DROP TRAILER

[76] Inventor: Donald E. Wise, 128 E St., Apt. D, Springfield, Oreg. 97477

[21] Appl. No.: 149,308

[22] Filed: May 13, 1980

[51] Int. Cl.³ .............................................. B62D 27/02
[52] U.S. Cl. .................................. 296/182; 280/43.11
[58] Field of Search ................ 296/24 C, 25, 26, 181, 296/182; 280/43.11, 43.22, 43.23

[56] References Cited

U.S. PATENT DOCUMENTS

| | | | |
|---|---|---|---|
| 2,776,146 | 1/1957 | Marino | 280/43.11 |
| 2,970,861 | 2/1961 | Short | 296/24 C |
| 3,019,763 | 2/1962 | Ferris | 296/24 C X |
| 3,430,791 | 3/1969 | Moss | 280/43.23 |

*Primary Examiner*—Joseph F. Peters, Jr.
*Assistant Examiner*—Norman L. Stack, Jr.
*Attorney, Agent, or Firm*—Harvey B. Jacobson

[57] ABSTRACT

Front, rear and center trailer frame sections are provided and the front section includes hitch structure for attachment to a towing vehicle while the rear section includes ground engageable support wheels. The front and rear sections include upper deck portions generally horizontally aligned with each other and the front section includes rear vertically spaced opposite side upper and lower mounting portions. The rear section includes vertically spaced opposite side upper and lower mounting portions and the center section is horizontally elongated and defines an upper deck extending longitudinally therealong. The opposite ends of the center section includes opposite side anchor points for alternate releasable substantially rigid anchoring to the front and rear section upper and lower mounting portions and the upper deck is substantially horizontally aligned with the upper deck portions of the front and rear sections when the anchor points are anchored relative to the upper mounting portions, the upper deck being spaced appreciably below the upper deck portions of the front and rear sections when the anchor points are anchored to the lower mounting portions.

11 Claims, 7 Drawing Figures

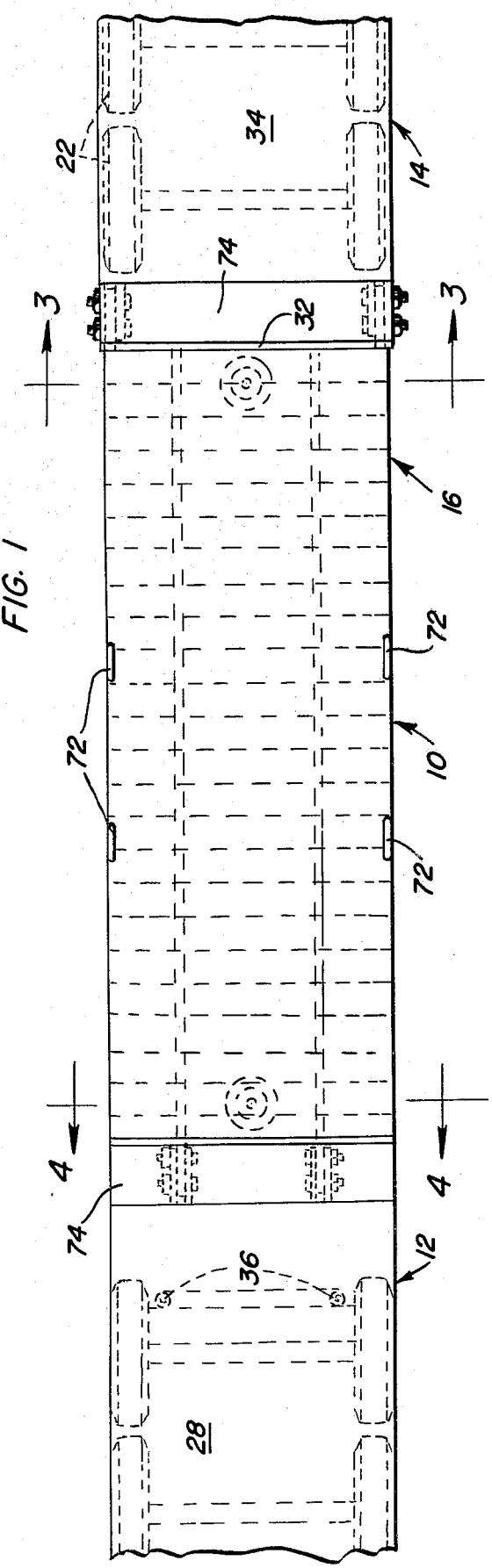
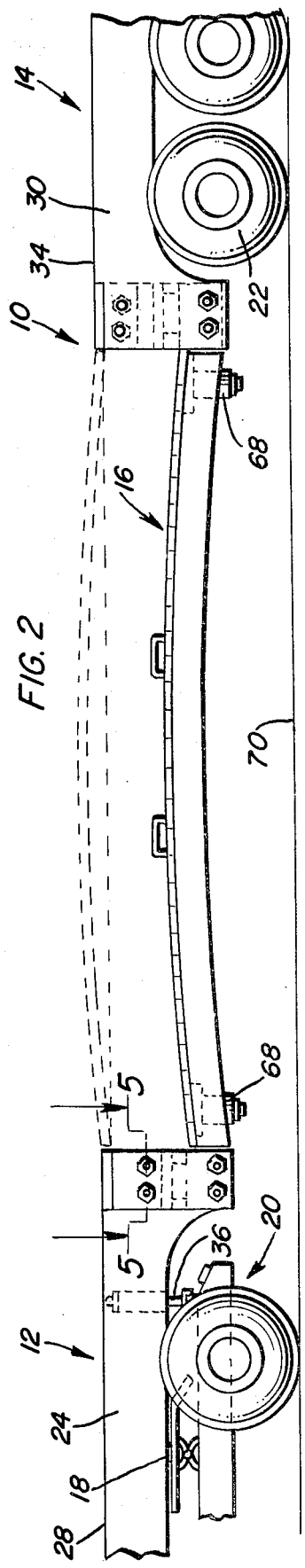

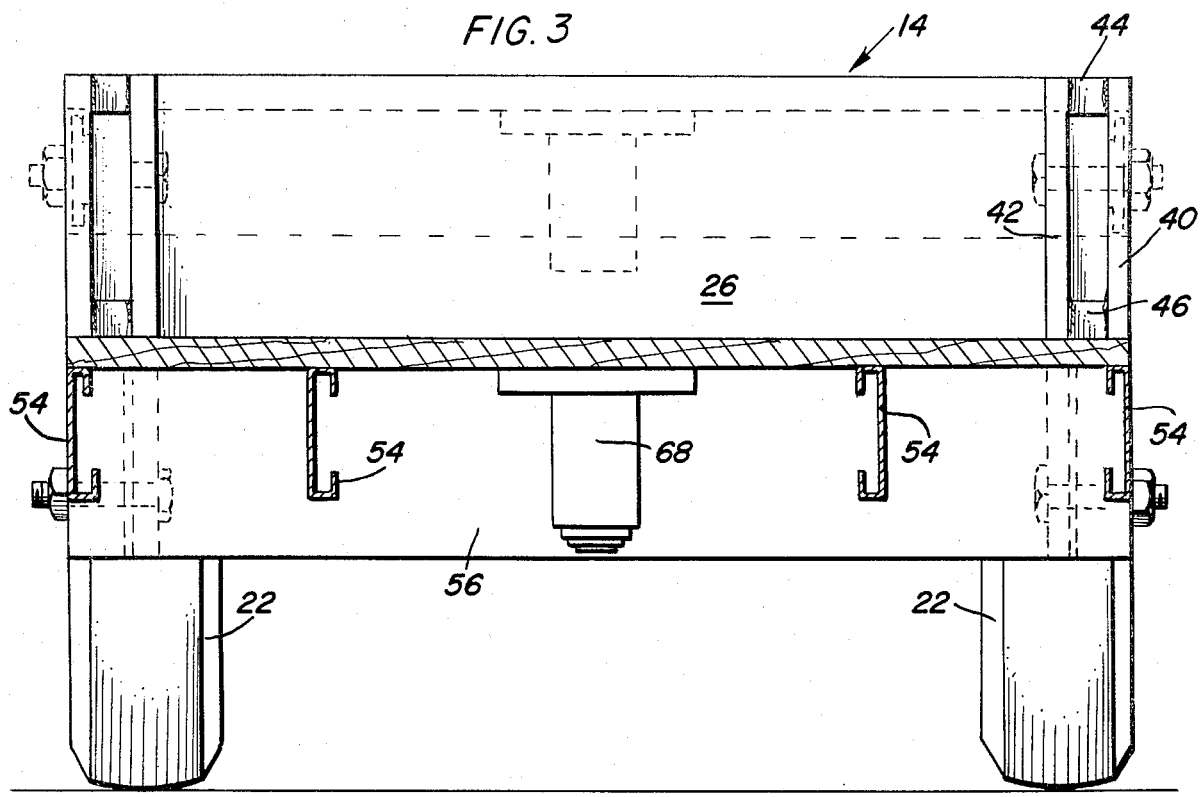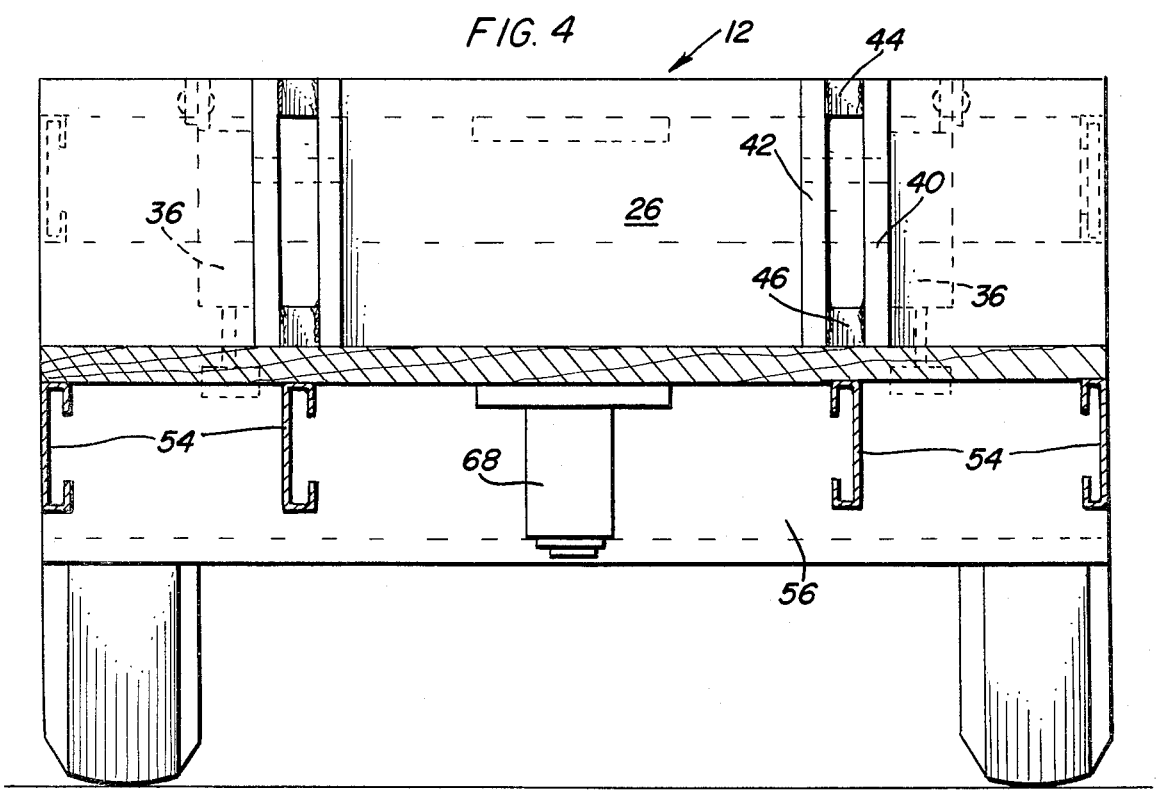

CONVERTIBLE FLAT/DROP TRAILER

BACKGROUND OF THE INVENTION

Various forms of semi-trailers presently being manufactured are referred to as "flats" in that they define a raised upper flat loading surface while other semi-trailers are termed "drop center trailers" inasmuch as the center load receiving portions thereof between the front and rear ends of the trailer are appreciably lowered relatively to the front and rear trailer ends.

"Flats" are conventionally utilized for carrying various forms of bulk equipment and supplies, whereas the "drop center trailers" are utilized primarily to carry heavy loads which may not be readily lifted to the high level of the load carrying surface of "flats". However, semi-trailers in many instances carry loads thereon in only one direction due to the unavailability of a return load on the same type being available. Furthermore, in many instances when a "drop center trailer" is utilized to carry a load in one direction, the only load which may be available therefor in the return direction comprises a load that may best be carried by a "flat". Accordingly, a need exists for an improved form of trailer which may be readily converted from a "flat" to a "drop center trailer".

Convertible trailers heretofore have been designed such as those disclosed in U.S. Pat. Nos. 1,719,587, 2,776,146, 2,970,861, 3,103,397, 3,319,393 and 4,092,039. However, these various forms of convertible and adjustable trailers are not capable of being readily completely transformed between "flat" and "drop center" trailer configurations.

BRIEF DESCRIPTION OF THE INVENTION

The trailer construction of the instant invention includes means whereby it may be readily converted from a "flat" configuration to a "drop center" configuration and the structure of the trailer by which the conversion from one configuration to the other is such that a trailer body of considerable strength is provided in either configuration.

The main object of this invention is to provide a trailer construction which may be readily converted between "flat" and "drop center" configurations.

Another object of this invention is to provide a semi-trailer in accordance with the preceding objects and which may be readily trailed behind a tractor in the manner of a conventional semi-trailer.

Still another important object of this invention is to provide a trailer construction including structure by which the conversion of the trailer between "flat" and "drop center" configurations may be accomplished in a minimum amount of time.

A final object of this invention to be specifically enumerated herein is to provide a trailer construction in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherin like numerals refer to like parts throughout.

BRIEF DESCRIPTION OF THE DRAWINGS

FIG. 1 is a top plan view of the trailer construction of the instant invention;

FIG. 2 is a side elevational view of the assemblage illustrated in FIG. 1 and with the center section of the trailer in a "drop center" configuration position and illustrated in the "flat" configuration in phantom lines;

FIG. 3 is an enlarged fragmentary transverse vertical sectional view taken substantially upon the plane indicated by the section line 3—3 of FIG. 1;

FIG. 4 is an enlarged transverse vertical sectional view taken substantially upon the plane indicated by the section line 4—4 of FIG. 1;

DETAILED DESCRIPTION OF THE INVENTION

Figure 5:
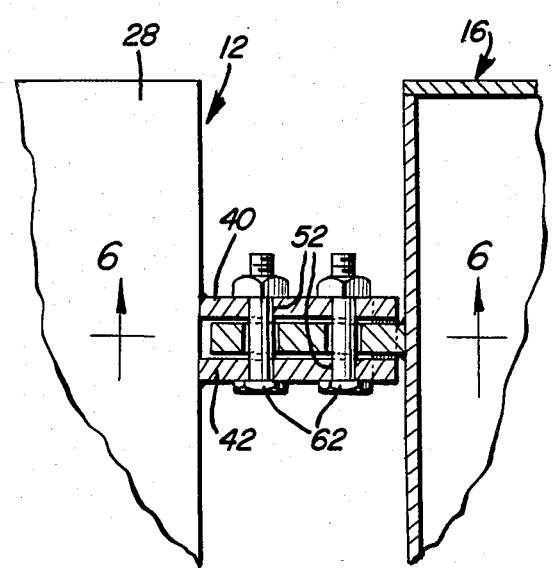
FIG. 5 is an enlarged fragmentary horizontal sectional view taken substantially upon the plane indicated by the section line 5—5 of FIG. 2.
Figure 6:
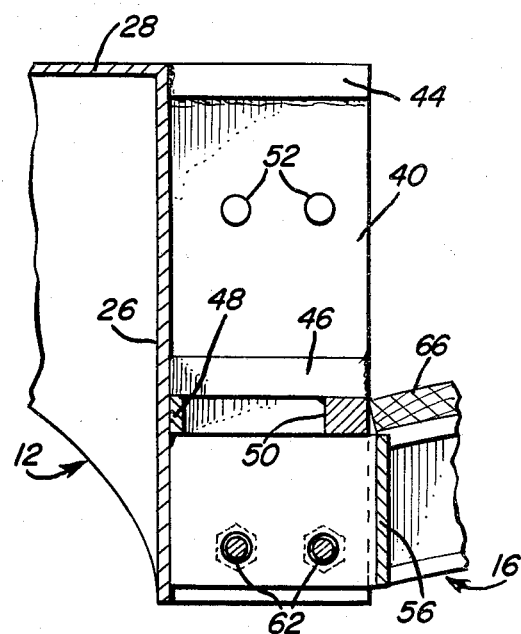
FIG. 6 is a fragmentary vertical sectional view taken substantially upon the plane indicated by the section line 6—6 of FIG. 5.
Figure 7:
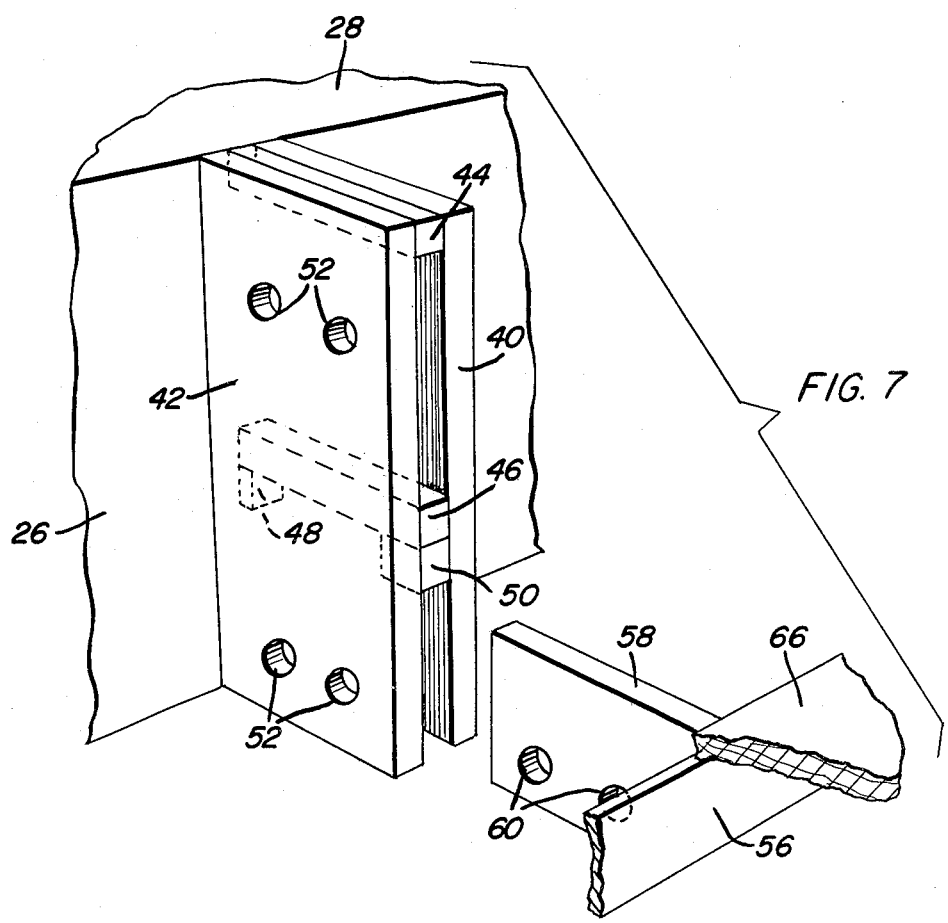
FIG. 7 is a fragmentary perspective view illustrating the mating rear mounting portions on one side of the rear of the front trailer section and the corresponding anchor point carried by the same side of the forward end of the trailer center section.

Referring now more specifically to the drawings the numeral 10 generally designates the trailer construction of the instant invention. The trailer construction 10 includes a front section referred to in general by the reference numeral 12, a rear section referred to in general by the reference numeral 14 and a center section referred to in general by the reference numeral 16.

The front section 12 defines a depending kingpin 18 for coupling to a tractor referred to in general by the reference numeral 20 in the conventional manner and the rear section 14 includes conventional ground engaging support wheels 22.

The front section 12 includes opposite side vertical frame plates 24 interconnected at their rear ends by a rear transverse frame plate 26 and an upper deck portion 28 extends over the vertical frame portions 24 to provide a load supporting surface.

The rear section 14 likewise includes opposite side vertical frame plates 30 interconnected at their forward ends by a forward transverse frame plate 32 and the rear section 14 includes an upper deck portion 34 which overlies the vertical frame plates 30 and the transverse frame plate 32. The deck portions 28 and 34 are substantially horizontally aligned and it may be seen that the front trailer section 12 includes a pair of depending hydraulic jacks 36 which may be extended downwardly and engaged with the opposite side frame portions of the tractor 20 in order to maintain the front trailer section 12 generally horizontally disposed. It is to be understood that the rear trailer section 14, because of being supported from the support wheels 22, will be supported in generally horizontal position when the center and rear sections 16 and 14 are disconnected.

The rear and front ends of the front and rear sections 12 and 14 include pairs of opposite side vertical mounting plates 40 and 42 projecting endwise outwardly thereof and abutment plates 44 are secured between the upper ends of each pair of plates 40 and 42 while spacing plates 46 and abutment blocks 48 and 50 are secured between intermediate portions of each pair of mounting plates 40 and 42. The mounting plates 40 and 42 each include horizontally spaced apart aligned bores 52 formed therethrough both above the spacing plate 46 and below the spacing plate 46. Thus, each pair of mounting plates 40 and 42 defines a pair of vertically spaced mounting portions above and below the corresponding spacing plate 46.

The center section 16 includes a pair of longitudinal beams 54 interconnected at their opposite ends by front and rear transverse beams 56 and opposite end portions of the transverse beams 56 include mounting flanges 58 projecting endwise outwardly of the center section 16 and including horizontally spaced bores 60 formed therethrough. The flanges 58 are receivable in the mounting locations defined between the mounting plates 40 and 42 above and below the spacing plates 46 and threaded bolts 62 may be passed through the bores 60 and a pair of bores 52 with which the bores 60 are aligned in order to rigidly secure the front and rear ends of the center section 16 in elevated or lowered positions relative to the front and rear ends of the rear and front sections 14 and 12.

The center section 16 includes a deck 66 disposed over the beams 54 and 56 and the opposite ends of the center section 16 include downwardly projectable hydraulic cylinders 68 for engagement with the ground 70 upon which the wheels 22 rest. The hydraulic cylinders 68 may be utilized to raise and lower the center section 16 between the lowered position thereof illustrated in solid lines in FIG. 2 and the raised phantom line position thereof illustrated in FIG. 2.

Opposite side portions of the center section 16 also include longitudinally spaced lifting eyes 72 whereby lifting mechanisms may be connected to the center section 16 if desired. Further, each of the deck portions 28 and 34 includes a co-extensive plate 74 overlying the corresponding mounting plates 40 and 42.

In operation, it will be evident that the cylinders 68 may be utilized to raise and lower the center section 16 into the desired elevated position to be received either above or below the spacing plate 46 and that the threaded fasteners 62 may thereafter be installed in order to anchor the center section 16 in proper desired position between the front and rear sections 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A trailer construction including front, rear and center sections, said front section including hitch means for attachment to a towing vehicle and said rear section including ground engageable support wheels, said front and rear sections including longitudinally spaced generally horizontally aligned upper deck portions, said front section including rear vertically spaced upper and lower mounting portions, said rear section including front vertically spaced upper and lower mounting portions, said center section being horizontally elongated and defining an upper deck extending longitudinally therealong, the opposite ends of said center section including rear and front anchor means engageable with selected corresponding upper and lower mounting portions of said front and rear sections with which said anchor means are horizontally aligned upon relative longitudinal displacement between said center sections and said front and rear sections for releasable and substantially rigid anchoring to said upper and lower mounting portions, said upper deck being substantially horizontally aligned with said upper deck portions when said anchor means are anchored relative to said upper mounting portions and spaced appreciably below said upper deck portions when said anchor means are anchored relative to said lower anchor portions.

2. The trailer construction of claim 1 wherein the opposite ends of said center section include downward projectable ground engageable jack structures.

3. The trailer construction of claim 1 wherein said center section includes opposite side lifting eyes.

4. The trailer construction of claim 1 wherein each of said mounting portions includes a pair of closely laterally spaced vertical flange portions, said anchor means including vertical mounting flanges supported from and projecting endwise outwardly from opposite ends of said center section and snugly telescopingly receivable between the corresponding flange portions, each pair of flange portions having horizontally spaced pairs of transverse bores formed therethrough, each of said mounting flanges having a pair of spaced bores formed therethrough and registrable with the corresponding pair of flange portion bores, and shank type fasteners removably secured through each of said mounting flange bores and the corresponding mounting flange portion bores.

5. The trailer construction of claim 4 wherein the mounting flange portions of each upper and lower mounting portion are integral, each pair of mounting flange portions having a horizontal spacing plate secured therebetween centrally intermediate the opposite ends thereof defining the corresponding upper mounting portion thereabove and the corresponding lower mounting portion therebelow.

6. The trailer construction of claim 1 wherein said upper deck is upwardly convex.

7. The trailer construction of claim 6 wherein the opposite ends of said center section include downward projectable ground engageable jack structures.

8. The trailer construction of claim 7 wherein said center section includes opposite side lifting eyes.

9. The trailer construction of claim 8 wherein each of said mounting portions includes a pair of closely laterally spaced vertical flange portions, said anchor means including vertical mounting flanges supported from and projecting endwise outwardly from opposite ends of said center section and snugly receivable between the corresponding flange portions, each pair of flange portions having horizontally spaced pairs of transverse bores formed therethrough, each of said mounting flanges having a pair of spaced bores formed therethrough and registrable with the corresponding pair of flange portion bores, and shank type fasteners removably secured through each of said mounting flange bores and the corresponding mounting flange portion bores.

10. The trailer construction of claim 1 wherein the front trailer section includes opposite side downwardly extendible hydraulic jacks disposed rearward of said hitch means and adapt to engage opposite side rear frame portions of a tractor to which said trailer construction is hitched for supporting the rear end of said center section in desired elevated position.

11. The combination of claim 10 wherein the opposite ends of said center section include downward projectable ground engageable jack structures.

* * * * *